H. F. LLOYD.
VALVE GEAR FOR INTERNAL COMBUSTION ENGINES.
APPLICATION FILED APR. 26, 1907.

903,741.

Patented Nov. 10, 1908.
2 SHEETS—SHEET 1.

H. F. LLOYD.
VALVE GEAR FOR INTERNAL COMBUSTION ENGINES.
APPLICATION FILED APR. 26, 1907.

903,741.

Patented Nov. 10, 1908.

2 SHEETS—SHEET 2.

UNITED STATES PATENT OFFICE.

HERBERT FETHERSTON LLOYD, OF SUTTON COLDFIELD, NEAR BIRMINGHAM, ENGLAND.

VALVE-GEAR FOR INTERNAL-COMBUSTION ENGINES.

No. 903,741. Specification of Letters Patent. Patented Nov. 10, 1908.

Application filed April 26, 1907. Serial No. 370,533.

*To all whom it may concern:*

Be it known that I, HERBERT FETHERSTON LLOYD, a subject of the King of Great Britain and Ireland, and residing at Coleshill Lodge, Sutton Coldfield, near Birmingham, in the county of Warwick, England, have invented certain new and useful Improvements in and Relating to Valve-Gear for Internal-Combustion Engines, of which the following is a specification.

This invention relates to internal combustion engines of the constant pressure, slow combustion or flame type, working e. g. with a two or four stroke cycle. In engines of this type at present proposed the flame is not usually under control and causes undue heating of parts adjacent the point of ignition, combustion is imperfect and obtained with difficulty, the flame is liable to strike back to the point of entrance of the gases, and much heat is lost through the inclosing walls of the engine.

The object of my invention is to construct an engine which shall overcome these difficulties and be commercially practicable.

My invention consists in an internal combustion engine of the flame type, having a movable valve with inducing nozzles, said valve itself being adapted to control the induction through the nozzles.

My invention further consists in an internal combustion engine in which the mixture during combustion is separated from the inclosing walls by air or other inert gas directed by an annular shell or the like.

Figure 1:
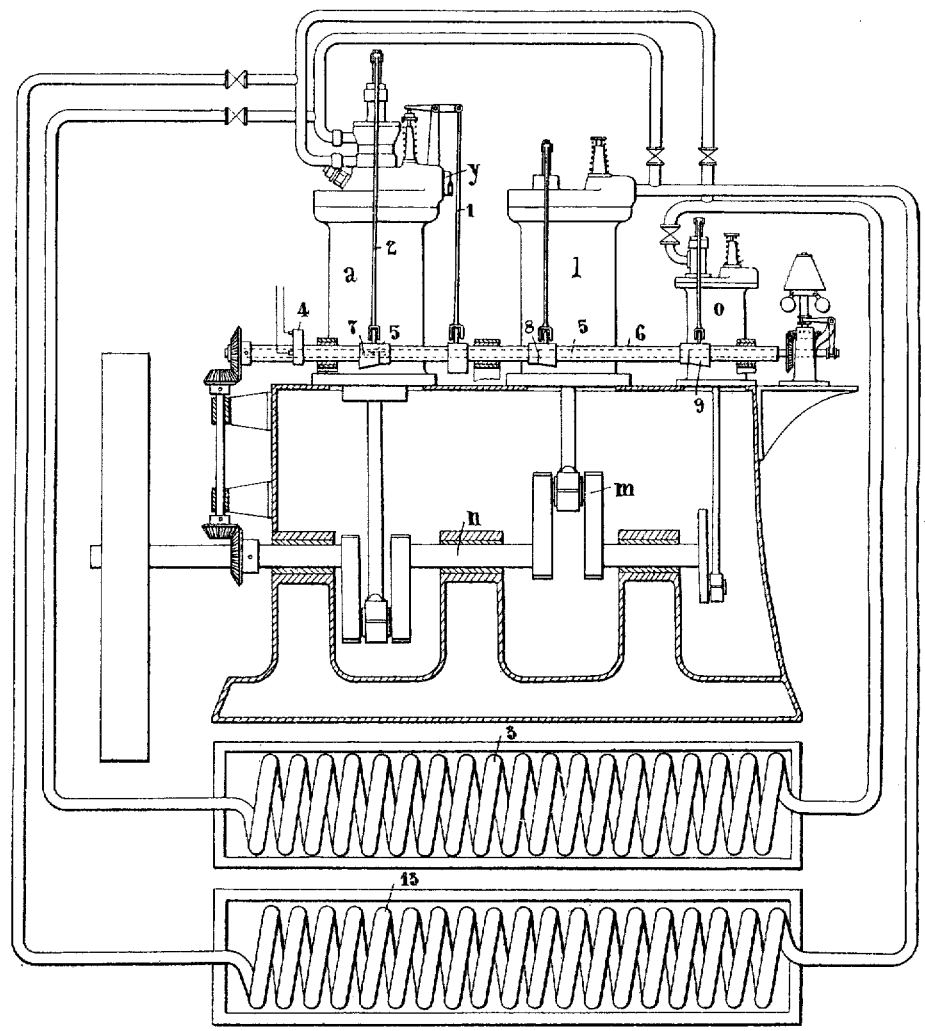
Figure 2:
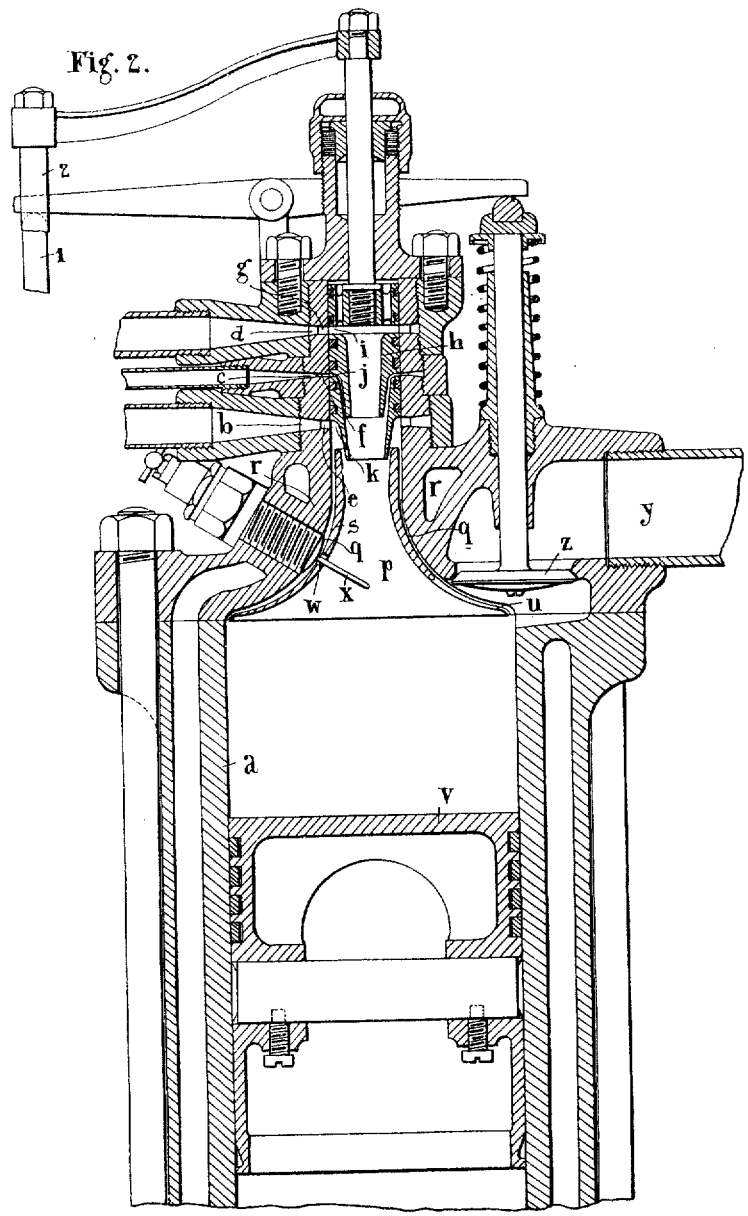

Referring to the accompanying diagrammatic drawings, Figure 1 represents in elevation a vertical engine constructed according to one form of my invention, Fig. 2 being a detail view of the same to an enlarged scale.

In carrying my invention into effect according to the form illustrated, applied by way of example in a two stroke type gas engine in which main and auxiliary air supplies are used, I construct near the end of the cylinder, $a$, three inlets, $b, c, d,$ preferably leading to annular ports, $e, f,$ and $g,$ respectively in a valve chamber. Working in the valve chamber is a hollow piston valve, $h,$ having three openings, $i, j,$ and $k,$ this last in the form illustrated being formed by the external shoulder of the valve, adapted to register with the annular ports referred to above, two of the openings in this instance $i$ and $j$—being constructed to act as inducing nozzles. By the use of a combined inlet and mixing valve it is apparent that the necessary clearance volume is reduced, that the gases are thoroughly mixed in a short length and waste of combustible after cut-off minimized.

The inlet for the first port, $g,$ is connected with a reservoir of compressed air at say 200 lbs. per square inch pressure, in this instance obtained from an air pump cylinder, $l,$ operated from the engine shaft, $n.$ The inlet for the second port, $f,$ is connected with say gas at 190 lbs. per square inch, in this instance obtained from a gas pump, $o,$ operated from the main shaft, $n,$ a convenient size for which is approximately one-eighth of the capacity of the air pump when the latter is of the same capacity as the motor cylinder. The third inlet for the port, $e,$ is connected with a supply of air at about in this example, 180 lbs. per square inch pressure.

The gas and air inlets are shown together for purposes of illustration but are preferably led in at different angles for constructional purposes. Gas and air receivers diagrammatically represented as 3 and 13 respectively may be provided in any suitable place, and are conveniently made of weldless steel tubing.

When the openings in the valve register with the ports in the piston chamber the 200 lbs. pressure air entering the valve at $i,$ will induce gas already at 190 lbs. at, $j,$ and then the second air supply of 180 lbs. at, $k.$ The second air supply is divided into two parts, the main part mixes with the air and gas from the first and second ports and forms part of the combustible mixture and passes into the space, $p.$ The other part of the second air supply referred to above flows in a narrow space, $q,$ between the external walls, $r,$ and an annular shell, $s,$ forming the wall of the chamber, $p.$ This part of the air prevents to a great extent loss of heat from the chamber, $p,$ and also injury to the inclosing walls, because the greater part of it travels axially thus forming an annulus of air. Some portion however may mix with the burning gases and products of combustion and thus reduce their temperature. The proportion which mixes with the products depends chiefly on the dimensions of the annular shell $s$ which may be varied as desired. It should here also be noted that combustion takes place chiefly inside the cylinder and there is therefore no separate combustion chamber practically speaking.

Suitable openings, for example, *w* and *u*, in the annular shell are provided for an ignition device, *x*, and also for a connection with the exhaust, *y*, respectively.

The exhaust valve, *z*, is operated as usual from an exhaust valve rod, 1, in connection with the cam shaft and the piston valve from a piston valve rod, 2. The ignition device illustrated is of the well known high voltage type controlled from ignition gear 4 on the valve shaft, in this instance running at the same speed as the main shaft.

The cam shaft, 5, slides inside the hollow valve shaft, 6, and has keyed on to it three taper cams, 7, 8, and 9, by keys passing through slots in the shaft 6—operating the motor cylinder cut off, air pump admission and gas pump admission valves respectively. These cams are adapted to be moved by the governor and so vary the engine cut off and the amount of charge in the pumps, according to the demand.

Although I have described my invention as applied to a gas engine I may also apply it to any form of internal combustion engine, for example, one using liquid fuel appropriately vaporized. Further the pressures referred to herein may be varied as necessary as they are only inserted for explanation of the invention in one form. Further my invention is applicable to engines of any size. The example illustrated would conveniently be made with a cylinder of 4 inch bore and 8 inch stroke, and a piston valve of 1 inch diameter by ⅜ inch stroke. For a larger engine the exhaust opening, *u*, could be relatively smaller than that shown and therefore not interrupt the annular shell, *s*, so much as that illustrated.

An engine such as I have described may be applied to motor cars, as a marine engine or as a stationary engine, its chief advantages for these and other purposes being that it is self-starting with the crank in forward position, or if there are a sufficient number of cranks, silent and smooth in running owing to absence of explosion, and possesses great flexibility due to its variable cut off.

Although in the form shown I have used electric ignition, any other suitable type of ignition may be utilized, and I may if desired use the motor cylinder for compressing the air or part of the air and exhaust at constant volume, forming a modified Diesel or like engine in which either a two or four stroke cycle could be followed. The third inlet instead of supplying an additional quantity of air may instead supply other inert elastic fluid or the engine may be constructed without said inlet.

In the description of the piston valve it is to be understood that the suction induced in the two nozzles need not take place through the interior of the valve but that induced from the end nozzle may conveniently occur around the periphery of the same, as shown in Fig. 2.

In the operation of my device a "piston" type of valve is not essential and therefore I do not wish to be understood as limiting myself to this type, although it forms a convenient and simple kind of valve. Further it should be noted that means for the reciprocation and governing of the valve are not herein described as any suitable means may be employed.

The position of the valve ports may if desired be arranged to cut off the fuel supply before the air whereby the flame is prevented from striking back to the nozzle, and the dimensions of the nozzles are preferably such that the mixture is only properly combustible after it has passed the end nozzle. By this means the ignition may be delayed to practically any required extent. It will be seen that this engine can easily be arranged for reversing.

Having now described my invention what I claim as new and desire to secure by Letters Patent is:—

1. In combination in an internal combustion engine of the constant pressure type, an annular shell acting to produce an axially moving fluid annulus insulating the flame and hot gases from their inclosing walls; as and for the purposes set forth.

2. In combination in an internal combustion engine of the constant pressure type, a combined inlet valve and mixing device, air ports in said valve, gas ports in said valve, the ports being arranged for the induction of one fluid by the other; as set forth.

3. In combination in an internal combustion engine of the constant pressure type, a movable valve with inducing nozzles, said valve itself acting to control the induction through the nozzles.

4. In combination in an internal combustion engine of the constant pressure type, a movable valve, ports in said valve, ports in the cylinder with which the valve ports are adapted to register at intervals, means for delivering air under pressure to one of said cylinder ports, and means for delivering gas at a different pressure to another of said ports, the fluid of greater pressure acting to induce into the cylinder the fluid of less pressure, and an annular shell adapted to insulate the hot gases from the external walls; as set forth.

5. In combination in an internal combustion engine of the constant pressure type, a movable hollow valve, two ports leading to the interior of said valve, a reduced end on said valve, an air port in the cylinder adapted at one position of the movable valve to register with one of said valve ports, a gas port in the cylinder adapted to register with another of said valve ports and another air or inert fluid port opposite which is the reduced portion of the valve when the air and gas ports in the cylinder and valve register, an annular shell arranged to leave an annular fluid space between the hot fluids and the external walls, one edge of said shell entering a space between the reduced end of the valve and the surrounding wall and means for admitting air under pressure to one of said ports, means for admitting gas at less pressure to another of said ports and means for admitting fluid at a still less pressure to the other of said ports whereby the fluid at higher pressure acts to induce the fluids of less pressure.

In testimony whereof, I affix my signature in presence of two witnesses.

HERBERT FETHERSTON LLOYD.

Witnesses:
LEWIS DRAKE BROCKMANN,
J. P. PIERSON.